Nov. 30, 1937.  A. C. WICKMAN  2,100,889
SPEED CHANGING MECHANISM
Filed April 12, 1935   3 Sheets-Sheet 1
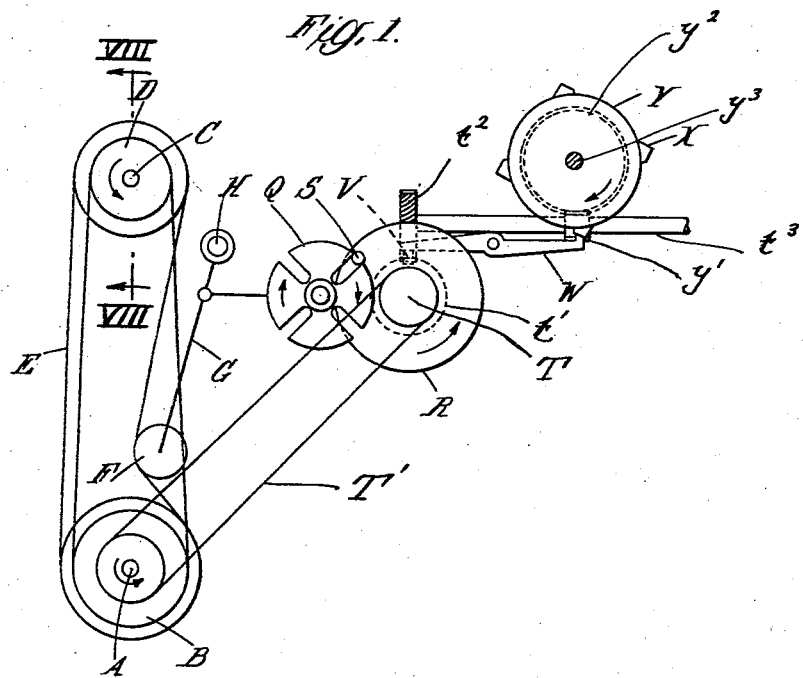
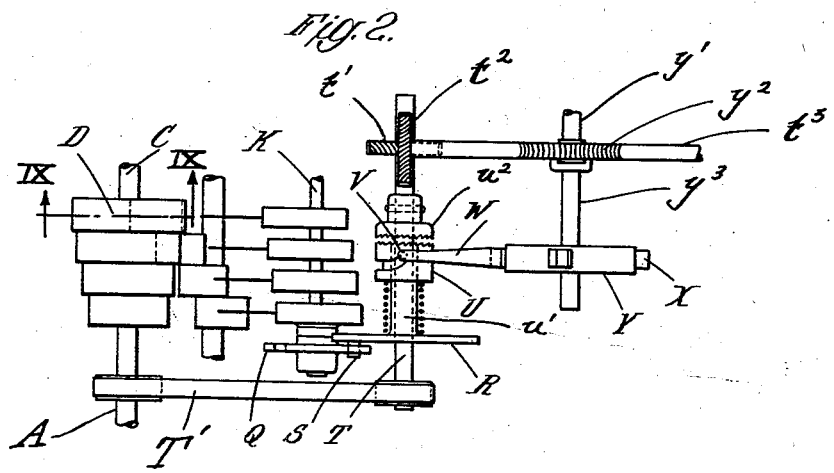
INVENTOR
AXEL CHARLES WICKMAN
BY Haseltine, Lake & Co.
ATTORNEYS Nov. 30, 1937.    A. C. WICKMAN    2,100,889
SPEED CHANGING MECHANISM
Filed April 12, 1935    3 Sheets-Sheet 2
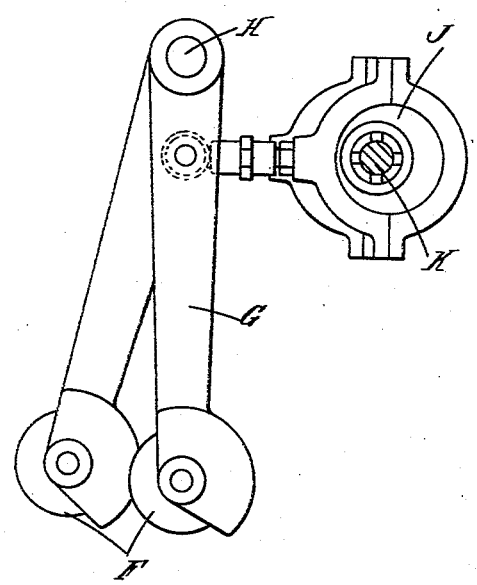
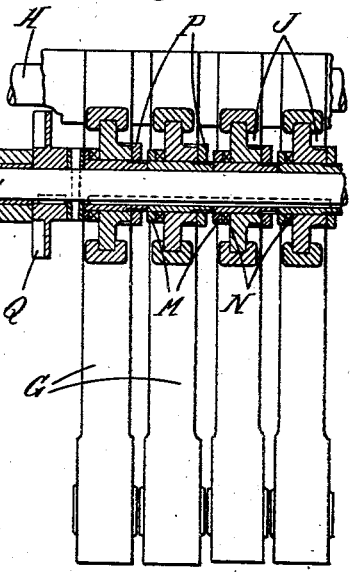
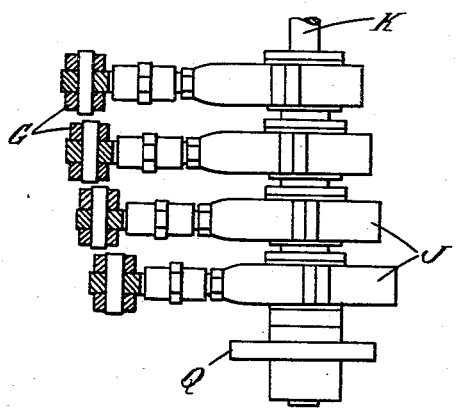
INVENTOR
AXEL CHARLES WICKMAN

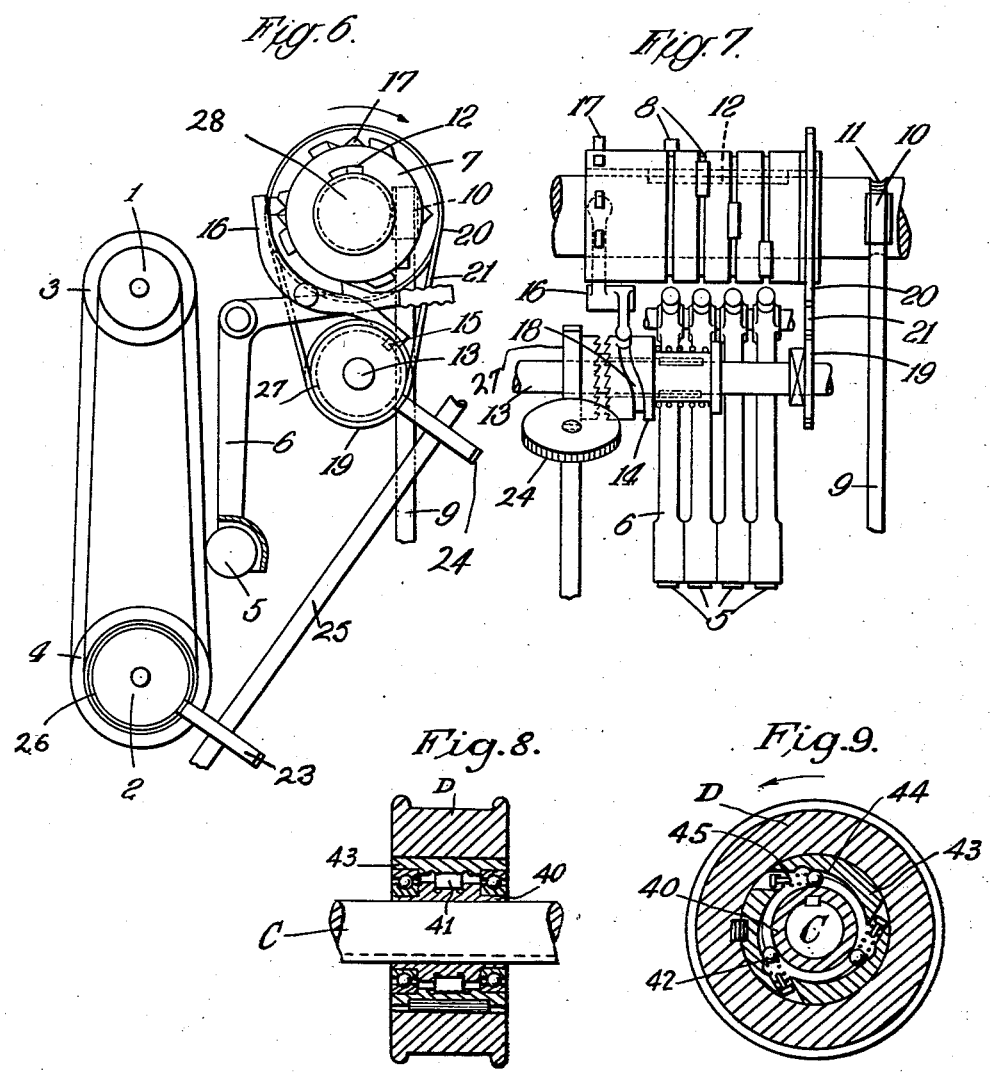

Patented Nov. 30, 1937

2,100,889

UNITED STATES PATENT OFFICE 2,100,889

SPEED CHANGING MECHANISM

Axel Charles Wickman, Coventry, England

Application April 12, 1935, Serial No. 15,992
In Great Britain April 13, 1934

10 Claims. (Cl. 74—217)

This invention relates to speed changing mechanism of the kind comprising a driving shaft carrying a group of belt pulleys and a driven shaft carrying a complementary group of belt pulleys combined with jockey pulleys each adapted to place in tension one of the belts, which are normally slack, its object being to provide improved means for changing the speed of rotation of a driven shaft in relation to the speed of rotation of a driving shaft automatically in accordance with a predetermined cycle and frequency of speed changes. The invention is especially useful in connection with machine tools, for varying the speed of work or tool holding spindles or the rate at which tools are fed to the work.

According to the invention, intermittent rotating means for moving the jockey pulleys into engagement with the respective belts to effect tensioning of any of the belts at predetermined intervals of time are driven by means of servo mechanism, that is, by intermediate power actuated mechanism controlled by a timing drum or disc.

The intermittent rotating element for moving the jockey pulleys into engagement with the respective belts may comprise groups of eccentrics, cams, or cranks, angularly spaced relatively to each other, and preferably adjustably mounted to permit alteration of the sequence of belt tensioning.

In order that the said invention may be clearly understood and readily carried into effect, the same will now be described more fully with reference to the accompanying drawings or diagrams illustrating an embodiment of the invention suitable for driving the work revolving spindle of an automatic lathe.

Figure 1 represents the device in elevation and Figure 2 is a plan. Figure 3 is an elevation on a larger scale of the eccentrics for actuating the idler pulleys, Figure 4 an elevation, partly in section, taken at right angles to that in Figure 3, and Figure 5 a plan of the eccentrics.

Figures 6 and 7 are elevations taken at right angles to each other illustrating the use of cams instead of eccentrics.

Figure 8 is a section taken on the line VIII—VIII in Figure 1.

Figure 9 is a section taken on the line IX—IX in Figure 2.

A driving shaft A on which are secured four belt pulleys B is mounted below and parallel to the work spindle C, upon which are mounted four complementary belt pulleys D incorporating free wheels or over-running unidirectional driving means between each complementary pulley and the work spindle, arranged to ensure the spindle being driven by the fastest revolving pulley of the group mounted upon it. The mentioned over-running unidirectional driving may be of any well known forms, one form of construction being illustrated by way of an example in Figures 8 and 9. In this example, a sleeve 40 secured on the shaft C is recessed at 41 (Figure 8) to accommodate rollers 42 (Figure 9) and a sleeve 43 secured to the pulley D has cam surfaces 44 adjacent each of these rollers. When the pulley is driven in the direction of the arrow seen in Figure 9, the rollers 42 ride up the cam surfaces 44 and transfer a frictional drive from the part 43 to the part 40 on the shaft, but when the shaft tends to move faster than the pulley, the rollers due to their frictional contact with the sleeve 40 slide down the cam surfaces into inoperative positions. Light springs 45 confined in recesses in the part 43 tend to impel the rollers toward their operative positions, but are overcome by the frictional action of the part 40. The complementary pairs of driving and driven pulleys, B, D, are of suitable relative diameters to effect the desired speed ratio between the driving and driven shafts A and C, and the four belts E are each of sufficient length to hang loosely below each driving pulley B. For the tensioning of each belt when it is selected to transmit the drive, an idler or jockey pulley F is carried at the lower extremity of a lever G hanging pendulum-wise upon a shaft H in parallel location with the driving and driven shafts, and the said pulley F is adapted to be swung into engagement with the belt by connection with an eccentric J, see Figure 3. A jockey pulley with its actuating eccentric is employed for each belt, and the four eccentrics J are mounted upon a common shaft K in such manner as to permit alternative positions of maximum eccentricity and consequent alternative sequences of tensioning of the driving belts. One convenient manner of adjustably mounting the eccentrics is by means of collars M secured to the shaft, having projections N mating with corresponding recesses in the eccentric J engageable in alternative positions, and locked by threaded collars P preventing disengagement of the collars and eccentrics.

It will be apparent that, with four eccentrics mounted with their maximum ordinates at intervals of 90°, each 90° of rotation of the shaft carrying them will cause one belt to be tensioned while the remainder are slack.

The periodic partial revolution of the shaft K is conveniently effected by means of a radially slotted disc or "Geneva wheel" Q secured to it, and a further disc R carrying a roller S adapted to engage in the "Geneva wheel" slots to effect a quarter revolution of the eccentrics J for each revolution of the disc R carrying the roller S.

The roller carrying disc R is driven by a constant speed shaft T (driven by a belt T' from the shaft A) through a clutch U which is pressed into engagement by spring pressure, and disengaged upon completion of one revolution by an inclined face formed as a cam slot in the periphery of the driven half of the clutch, cooperating with a pin or roller V acting as an abutment. The clutch member U is splined on a sleeve $u^1$ carrying the disc R, and co-acts with a clutch member $u^2$ fast on the shaft T. The pin serves to hold the clutch in the disengaged position against the tendency of the spring to press it into engagement, and forms one end of a lever W adapted to be oscillated for the withdrawal of the pin V from the cam slot when it is desired that the clutch should engage, and to cause said pin to re-enter the cam slot to effect disengagement of the clutch. The oscillation of the lever W is conveniently effected by engagement with projections X adjustably mounted upon the periphery of a constantly revolving disc or trip drum Y, driven by a skew gear $t^1$ on the shaft T which through a skew gear $t^2$ on a shaft $t^3$ drives the said shaft $t^3$ on which is a worm $y^1$ driving a worm wheel $y^2$ on the shaft $y^3$ of the drum Y. Thus, when a projection engages with the lever, the pin is withdrawn from the cam slot, the clutch engages and the pin re-enters the cam slot causing the clutch to disengage after one revolution. The "Geneva wheel" Q is rotated through 90° and one of the eccentrics J presses its associated jockey pulley F tensioning one belt, while the other belts remain slack.

Subsequent operations of the clutch successively cause the other belts to be tensioned in the order selected by the relative settings of the eccentrics, for example, 1, 2, 3, 4, or 1, 4, 3, 2, or in any other sequence desired, whereby rapid changes of speed can be effected in accordance with any desired cycle and frequency.

In another embodiment of the invention, as shown in Figures 6 and 7, the driven shaft 1 and the driving shaft 2 carrying complementary groups of belt pulleys 3 and 4 and belts which are normally slack, are tensioned by rollers 5 carried on levers 6. The cam drum 7 carrying adjustably mounted cams 8 is driven by means of a shaft 9 rotated by any suitable means and carrying a worm 10 to convey rotary motion to the shaft 28 of the drum through worm wheel 11 and key 12. The angular adjustment of the cams 8 may be effected by means such as those already described with reference to the eccentrics J, or by slots, grooves, or keys and set screws in any other known or suitable manner. The cam drum 7 is provided with a keyway which is wider than the key 12, for a purpose which will presently be described.

A further power driven shaft 13 is driven from the shaft 2 by means of carrier wheels 23, 24, on an inclined shaft 25 suitably mounted in the machine frame, the wheel 23 engaging a gear wheel 26 on the shaft 2 and the wheel 24 engaging a gear wheel 27 on the shaft 13. This shaft 13 carries a spring loaded clutch 14, adapted to be held out of engagement by a peg 15 carried on a lever 16 suitably mounted in any convenient part of the machine frame and adapted to be oscillated by means of projections 17 mounted upon the cam drum, for the purpose of withdrawing the peg 15 from the cam like groove 18 in the driven member of the clutch to effect intermittent motion of the cam drum by means of chain 21 and sprockets 19 and 20 on the shafts 13 and 28 respectively. When a projection 17 engages with lever 16, causing the withdrawal of the peg 15 from the cam groove 18, the clutch member 14 engages and causes the cam drum to move rapidly in advance of the movement derived from the normal driving means, after which, the clutch disengages and the cam drum 7 does not receive further motion until the key 12 has taken up the same amount of movement which was derived from the accelerated driving means. In other words the relative speeds of the shafts 9 and 13 are of course designed with relation to the amount of motion by way of over-running which will be transmitted to the cam drum 7 over its supporting shaft 28, effected by one revolution of the shaft 13, a lost motion being obtained through the medium of the key 12 which can move in its key-way in a direction around the shaft 28. The inclined shaft 25 receives motion from the main driving shaft 2 through gears 26, 23, and transmits motion to the shaft 13 through gears 24, 27, and clutch 14, this being only effective when the said clutch is engaged by the action of the peg on the lever 16 when operated by the cam 17. The lost motion permits the cam drum 7 to be overdriven in relation to the shaft 28 through the medium of the clutch deriving motion from shaft 25, and the chain 21, the normal slow drive to the drum 7 derived from the shaft 9 being continuous. The shaft 13 is driven from one source only, that is, from 2 through 24, this drive being transmitted from shaft 13 when the clutch is engaged through the chain 21 to the shaft 28 of the drum 7, at a higher speed than that which the said shaft 28 receives from the shaft 9. The shaft 28 thus receives motion from two sources, that is, a slower constant drive from the shaft 9, and an intermittent faster drive from the shaft 13, the latter resulting in overrunning.

By this arrangement, the time taken to engage any jockey pulley for the purpose of tensioning the belt, is very short, the inclined face of the cams 8 actuating lever 6 being rapidly traversed.

What I claim and desire to secure by Letters Patent of the United States is:—

1. In speed changing mechanism, the combination of a driving shaft, a first group of belt pulleys carried thereby, a driven shaft, a second group of belt pulleys complementary to the first group of belt pulleys, undirectional means on said driven shaft supporting said second group of pulleys, belts for transmitting a drive from each belt pulley on the driving shaft to the corresponding opposite belt pulley on the drive shaft, said belts normally slack and inoperative, a complementary group of jockey pulleys, pivoted levers carrying said jockey pulleys, intermittent rotating means to actuate each of said levers in a predetermined sequence to press one of said jockey pulleys against one of said belts to tension said belt so as to transmit rotation to said driven shaft, and power driven timing mechanism to control the movements of said intermittent rotating means, said timing mechanism including a clutch, a constantly rotating drum, and means operable by said drum to engage and disengage said clutch.

2. Mechanism as in claim 1, including an oscillatory lever which is arranged to be actuated by the power driven timing mechanism to engage and disengage the clutch.

3. In speed changing mechanism, the combination of driving shaft, a first group of belt pulleys carried thereby, a driven shaft, a second group of belt pulleys complementary to the first group of belt pulleys, unidirectional means on said driven shaft supporting said second group of pulleys, belts for transmitting a drive from each belt pulley on the driving shaft to the corresponding opposite belt pulley on the drive shaft, said belts being normally slack and inoperative, a complementary group of jockey pulleys, pivoted levers, carrying said jockey pulleys, intermittent rotating means to actuate each of said levers in a predetermined sequence to press one of said jockey pulleys against one of said belts to tension said belt so as to transmit rotation to said driven shaft, and timing mechanism driven from said driving shaft to control the movements of said intermittent rotating means, said timing mechanism including a clutch, an oscillatory lever to engage and disengage said clutch, a constantly rotating drum, and means associated with said drum to actuate said lever.

4. Speed changing mechanism according to claim 1 including a disc adapted to be actuated through the clutch, a pin associated with said disc, a Geneva wheel adapted to be actuated by said pin and to transmit intermittent rotation to the intermittent rotating means controlling the selection of the jockey pulleys.

5. Speed changing mechanism according to claim 1, including a shaft carrying a timing drum and a series of cams to actuate the jockey pulley levers in sequence, means to rotate said shaft at a constant speed, said timing drum and cams being adapted to over-run said shaft, means to transmit an over-running movement to said timing cams, and a clutch to control said over-running movement.

6. Speed changing mechanism according to claim 1 including a shaft carrying a timing drum and a series of cams to actuate the jockey pulley levers in sequence, means to rotate said shaft at a constant speed, said drum and cams being adapted to over-run said shaft, a countershaft adapted to be driven from said shaft at an increased speed and to transmit an over-running movement to said cams, and a clutch to control said over-running movement.

7. A speed changing mechanism comprising a driving shaft, a group of belt pulleys mounted upon said driving shaft, a driven shaft, a complementary group of belt pulleys mounted upon said driven shaft, belts passing loosely and normally inoperatively around each complementary pair of driving and driven pulleys, a group of belt tensioning jockey pulleys, a pivoted lever for each belt, each lever carrying one of said belt tensioning jockey pulleys, power operated intermittent rotating means serving to cooperate with said levers selectively to press the jockey pulleys into tensioning engagement with the belts, power drive means operating said intermittent rotating means, a clutch to engage and disengage the power drive means to the said intermittent rotating means, and adjustably spaced continuously rotating cams controlling the frequency of operation of the said clutch, whereby the belts may be tensioned and the drive transmitted in any predetermined sequence and frequency.

8. Speed changing mechanism as in claim 7, in which the intermittent rotating means to press the jockey pulleys into tensioning engagement with the belts are eccentrics which only partially rotate intermittently.

9. Speed changing mechanism as in claim 7, in which the intermittent rotating means to press the jockey pulleys into tensioning engagement with the belts are cams adapted to over-run the cam-shaft.

10. Speed changing mechanism as in claim 7, having a cam shaft, and in which the power drive means includes a Geneva mechanism.

AXEL CHARLES WICKMAN.